United States Patent [19]
Thiry

[11] 3,749,906
[45] July 31, 1973

[54] VEHICLE HEADLAMP SHIELD
[75] Inventor: William G. Thiry, Oley, Pa.
[73] Assignee: Wagner Electric Corporation, Newark, N.J.
[22] Filed: Mar. 13, 1972
[21] Appl. No.: 234,294

[52] U.S. Cl......... 240/46.01, 240/41.25, 240/46.55, 313/117
[51] Int. Cl. ............................................ F21v 11/00
[58] Field of Search ..................... 240/41.2, 41.25, 240/41.35, 41.35 C, 41.35 D, 46.01, 46.45, 46.47, 46.49, 46.51, 46.55; 313/117

[56] References Cited
UNITED STATES PATENTS
| | | | |
|---|---|---|---|
| 1,205,361 | 11/1916 | Lakin | 240/41.35 C |
| 1,647,613 | 11/1927 | Fredette | 240/46.55 |
| 1,877,978 | 9/1932 | Sarver | 240/46.55 |
| 3,136,914 | 6/1964 | Jayne et al. | 313/117 |
| 2,876,375 | 3/1959 | Marsh | 313/117 |
| 3,020,435 | 2/1962 | Mead | 313/117 |
| 1,738,304 | 12/1929 | Laurent | 240/41.35 C |
| 1,583,216 | 5/1926 | Wompey | 240/41.35 C |
| 1,954,978 | 4/1934 | Aldrich | 240/46.55 |

Primary Examiner—Samuel S. Matthews
Assistant Examiner—Richard M. Sheer
Attorney—William D. Lucas et al.

[57] ABSTRACT

This invention relates to a shield to be used in a vehicle headlamp comprising a concave base member with curved or planar side wall sections having a channel member positioned in the central portion of the base member with the base of the channel projecting inwardly from the concave surface to prevent the direct light of the low beam filament from being projected or reflected forwardly as glare or uncontrolled light. The shield also acts to reduce and disperse the light it reflects thereby preventing excessive redirected light in unwanted regions.

14 Claims, 6 Drawing Figures

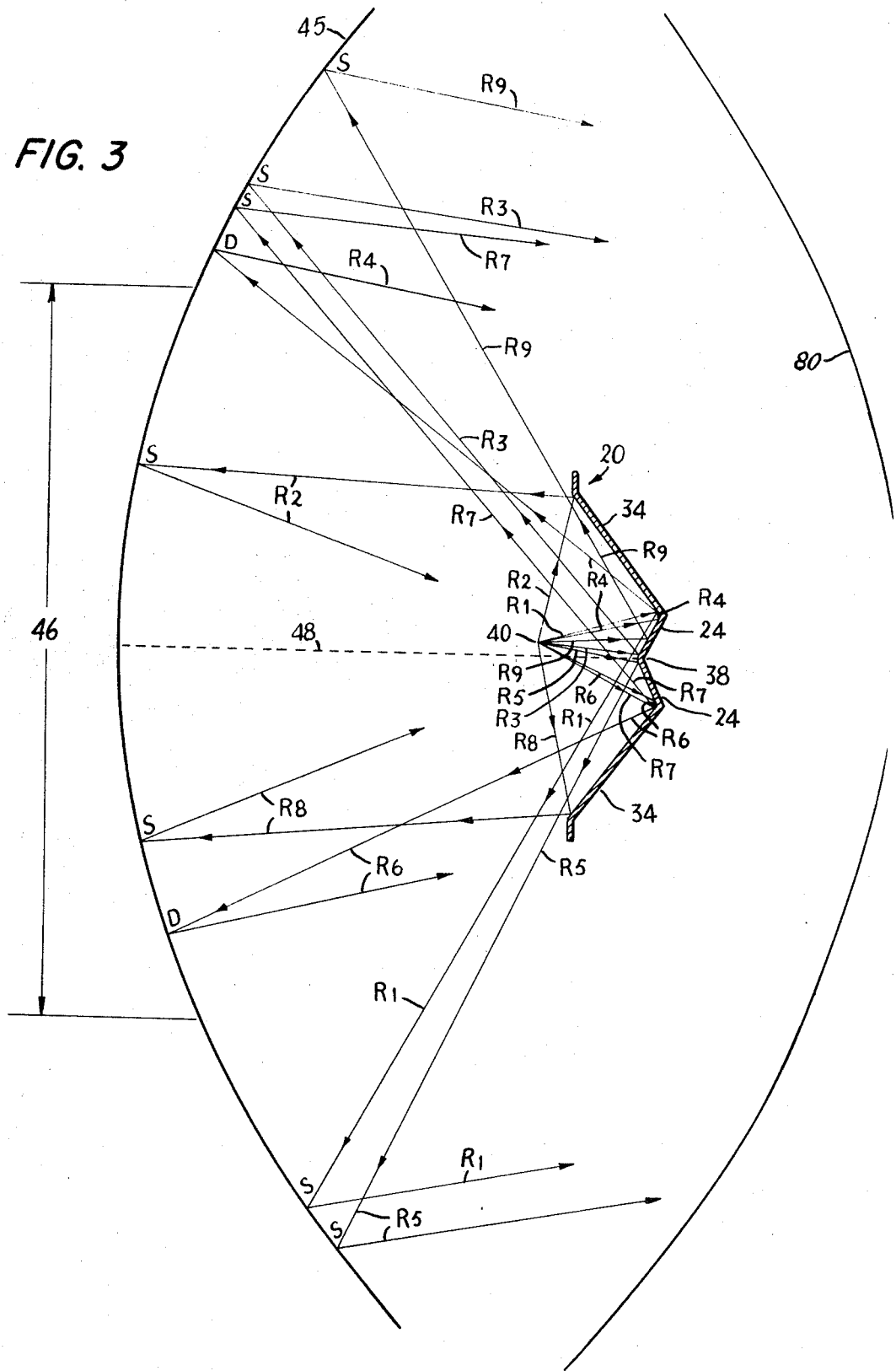

VEHICLE HEADLAMP SHIELD

In recent years shields for vehicle headlamps have been designed to compensate for vehicle styling changes which have lowered the headlamp and placed it to the rear of highly polished surfaces such as bumpers. Without a properly designed shield, the direct light of the low beam filament is reflected off these highly polished surfaces resulting in uncontrolled glare which especially impairs driver vision in fog, mist, rain or snow. A typical design is shown in U.S. Pat. No. 3,136,914, which describes a shield with a central aperture so arranged that the remaining solid portions cut off the direct light from the low beam filament at certain angles above and below the central axis of the filament. Such apertures are cut to permit direct light to pass from the filaments in the forward direction in the belief that road lighting ahead of the car is improved.

It is also customary to provide a shield that is a truncated cone or portion of a sphere which may be provided with concentric circular corrugations. In these cases, the surface of the shield in the vicinity of the optical axis of the lamp is placed at approximately 90° to this axis.

In these types of shields, no provision is made for the light reflected from the shield and such light is redirected and results in unwanted illumination especially in the regions designated at 1° up and 10° to 90° up in the SAE specification SAE J579a, Sealed Beam Headlamp Units for Motor Vehicles, P723, SAE Handbook, New York, 1972.

It is therefore the principal object of this invention to provide a shield which will not only eliminate direct light from being reflected from highly polished surfaces forward of the headlamp, but also to reduce and disperse the light reflected from the shield, thereby reducing unwanted illumination and glare, especially in fog, mist, rain or snow.

Briefly, the present invention comprises a shield constructed without an opening for light that moves directly forward from the low beam lamp filament. Openings may be provided at the opposite sides of the shield to provide side lighting in the near vicinity of the vehicle as an aid for detecting pedestrians, or obstacles, and for cornering.

The shield comprises a concave base member which may be curved, or spherical, or a combination thereof, or it may contain planar portions in combination with curved and/or spherical portions. Preferably the base member is in the general form of a dish or cup having a channel member positioned in the central portion of the base member so that the base of the channel projects inwardly from the concave surface. When openings are provided at opposite sides of the base member to provide side lighting, the side wall of the base member is divided into two oppositely disposed sections joined at opposite ends of the openings by the channel member and base member respectively. The side wall sections of the base member may have any desired configuration but best results are achieved with spherical side wall sections or side wall sections having a smooth curve, either alone or in combination with planar portions. The channel may be in the general form of a U but best results are achieved with a V-shaped channel member, the legs of which are connected to the planar portions of the side wall sections and form included interior angles with the planar portions of the side wall sections of between about ninety to one hundred and thirty five degrees.

The best dispersion of light is achieved by the V-shaped channel member which does not have any flat surface positioned normal to the axis of the filament of the lamp. Furthermore, a portion of the light reflected from the legs of the V will be directed against the side wall of the base member and thereby doubly reflected within the shield before reaching the main reflector of the lamp. This double reflection tremendously reduces the intensity of the light and assists in achieving a wider dispersion of what is ordinarily forward light from the low beam filament. When the interior angle formed by the V and a planar portion of a side wall section is less than 90° there is a tendency to reflect light into the heel of the reflector which gives objectionable glare in inclement weather and when the angle is greater than 135°, there is a tendency for all the light reflected from the legs of the V to be directed towards the reflector, especially into the heel portion, without first being reflected from the side wall sections.

When the interior angle is formed by the planar portion of a side wall section and a U-shaped channel member, or a curved side wall section and a V-shaped channel member, or a curved side wall section and a U-shaped channel member, the curved side wall section or the curve of the U, or both, are adjusted to obtain reflections which are equivalent to those obtained with a V-shaped channel member and the planar portion of a side wall section forming an interior angle of from 90°–135°. This may be readily done by adjusting the respective curved surface or surfaces to obtain acceptable light intensities corresponding to interior angles formed by a V-shape channel member and the planar portion of a side wall section of from 90°–135°, especially in the regions designated as 1° up and 10° up to 90° in SAE Specification SAE J579.

Further details of the invention may be readily understood by reference to the drawing which illustrates preferred embodiments and in which:

FIG. 3 is a side cross-section of the shield of FIG. 1 taken on line 3—3 showing the light distribution relationship with the headlamp reflector.

In the drawings the same number is used for an identical part whenever it occurs.

Figure 1:
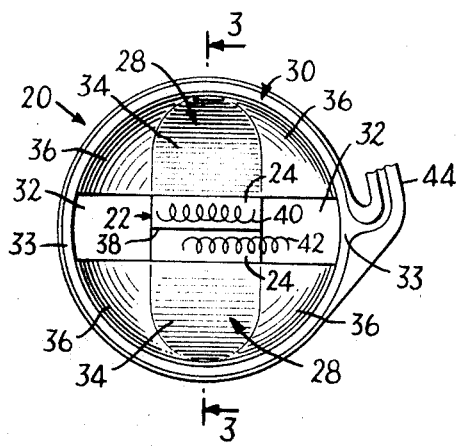
FIG. 1 is a front view of one preferred embodiment of the shield.
Figure 2:
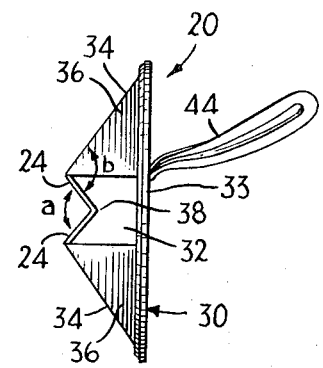
FIG. 2 is a side view of the shield of FIG. 1.

Referring now to the drawings in detail and in particular to FIGS. 1 and 2, 20 is a headlamp shield made up of a V-shaped center channel section 22 with each of the lateral surfaces 24 in opposite legs of the V connected to a side wall section 28 of the concave base member 30. Openings 32 are provided on both sides of the center channel section 22 between the oppositely disposed side wall sections 28. The side wall sections 28 are joined together at opposite ends of the openings 32 by the channel section 22 and by a connecting portion 33 of the base member 30. Each side wall section 28 is made up of a planar surfaced center portion 34 and a curved side portion 36. The side wall sections 28 form a concavity within which lies the base of channel section 22. The base or edge 38 formed at the junction of the lateral faces 24 of the channel section 22 protrudes into the volume delineated by the concave surface of the side wall sections 28 of the base member 30. When looking into the headlamp toward the reflector, the low beam filament 40 is preferably centered on the channel section 22 and positioned above the channel edge 38. The high beam filament 42 is preferably offset from the channel section 22 and located below the channel edge 38. The filaments are preferably positioned outside the concave surface of the base member 30 as shown in FIG. 3. The arm 44 is used to mount the shield in position in the lamp in conventional manner well-known in the art.

The operation of the shield will be explained with reference to FIG. 3. The low beam filament 40 is located outside the concave surface of the shield and all of the light rays which move directly forward from the filament strike the shield. The headlamp reflector surface is 45 and 46 is the heel portion of the reflector. The optical axis of the lamp is shown at 48. The headlamp lens is designated by 80. $R_1$ through $R_9$ are light rays emitted at different angles from the low beam filament 40 towards the shield 20. S denotes a ray which is singly reflected from the shield, and D denotes a ray which is doubly reflected from the shield. The manner in which the light will be reflected from the shield depends upon the angle $b$ formed by the side wall planar portion 34 and the channel lateral face 24, and the angle $a$ formed by the channel lateral faces 24 as shown in FIG. 2. In the preferred embodiment, angle $a$ is 126° and angle $b$ is 118°. As the value of these angles is changed the surface area of double reflection will change. In the present embodiment, approximately 60 percent of the surface of the channel member effects double reflection.

Rays such as $R_1$ and $R_2$, and $R_7$ and $R_8$, which initially strike the side wall planar portion section 34, are singly reflected from the shield surface to the reflector. Rays $R_1$ and $R_7$ are directed outside of the heel portion 46 of the reflector surface 45 and rays such as $R_2$ and $R_8$ are directed into the heel portion and are again reflected into the shield. All rays initially striking the side wall planar portion 24 of the shield can be grouped into rays such as $R_1$ and $R_7$, and rays such as $R_2$ and $R_8$.

Rays such as $R_4$ and $R_6$ which initially strike the channel lateral faces 24 of the channel member adjacent the planar portion 34 of the said side wall sections 28 are doubly reflected from the shield before being directed to the headlamp reflector 45.

Rays such as $R_9$ which strike the lateral face 24 just beyond the area of double reflection, are singly reflected from the shield, but similar to rays $R_1$ and $R_7$ are directed outside of the heel portion 46 of the reflector 45.

Rays such as $R_3$ and $R_5$ which initially strike the lateral face 24 in the area of the edge 38, are also singly reflected and directed outside of the heel portion 46.

The light reflected from the shield surface can then be classified into three types: (1) double reflected light; (2) singly reflected light which is directed into the heel portion of the reflector and redirected towards the shield; (3) singly reflected light which is directed outside the heel portion of the reflector.

A double reflection reduces the light intensity reaching the reflecting surface to a small percentage of that of direct forward light. For example, if the normally coated dull surface of the shield reflects 1 percent of the light impinging on it, double reflection would result in only 0.0001 of the original intensity reaching the reflector. Furthermore, the area over which the light is spread on the reflector is increased by double reflection and this too reduces effective intensity. Rays singly reflected from the shield into the heel area will eventually result in a double reflection since the reflector directs this light back into the shield.

Rays singly reflected from the shield to outside the heel portion, such as $R_2$, $R_3$, $R_8$ and $R_9$, are significantly diminished in intensity because they are spread over a greater area of the reflector, resulting in a relatively large dispersion and correspondingly low intensity.

As a result the "halo" which would normally be observed as uncontrolled light is significantly reduced in intensity by the use of the shield as evidenced by the reduction of light to below the maximum level allowed in the 1° up and 10° up to 90° region in SAE Specification J579a.

Figure 4:
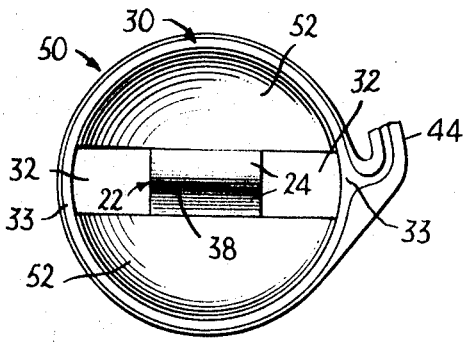
FIG. 4 is a front view of a modified embodiment of the shield in FIG. 1.

Referring to FIG. 4, a modified form of shield 20 is shown. Shield 50 is identical to shield 20 except that the concave base member has oppositely disposed conical side wall sections 52 instead of the planar and curved side wall sections of shield 20.

Figure 5:
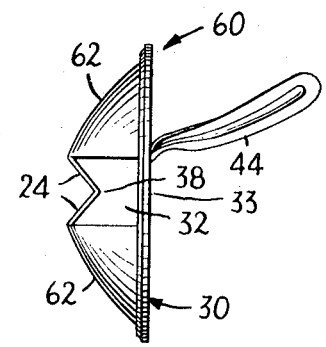
FIG. 5 is a side view of a modified embodiment of the shield in FIG. 1.

Similarly referring to FIG. 5, a modified form of a shield 20 is shown. Shield 60 is identical to shield 20 except that the concave base member 30 has oppositely disposed spherical side wall sections 62 instead of the planar and curved side wall sections of shield 20.

Figure 6:
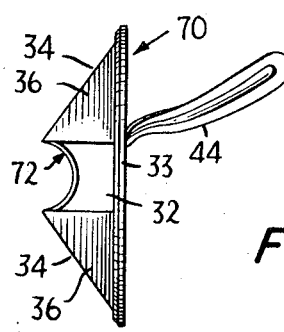
FIG. 6 is a side view of a modified embodiment of the shield in FIG. 1.

Referring to FIG. 6, a modified form of shield 20 is shown. Shield 70 is identical to shield 20 except that the channel portion 72 is U-shaped instead of the V-shaped channel portion of shield 20.

It will be understood that it is intended to cover all changes and modifications of the preferred forms of the invention, herein chosen for the purpose of illustration, which do not constitute departure from the spirit and scope of the invention.

What is claimed is:

1. A shield for use in a headlamp comprising a concave base member and a trough-shaped second member formed by a pair of opposed intersecting elongated surfaces, said trough-shaped second member being positioned in the central portion of said concave base member and at least partially protruding into the volume partially enclosed by the concave surface of said concave base member.

2. The shield of claim 1 wherein said second member is V-shaped.

3. The shield of claim 1 wherein said second member is U-shaped.

4. The shield of claim 1 wherein said concave base member is comprised of oppositely disposed side wall sections which have curved and planar portions.

5. The shield of claim 1 wherein said concave base member is spherically shaped.

6. The shield of claim 1 wherein said concave base member is conically shaped.

7. The shield of claim 1 wherein openings are provided in said base member adjacent said second member.

8. In combination with a headlamp comprising a concave reflector, a headlamp lens, and a source of light positioned between said lens and said reflector, a shield opposite said source of light and positioned between said source of light and said lens, said shield comprising a concave base member and a trough-shaped second member formed by a pair of opposed intersecting elongated surfaces, said trough-shaped second member being positioned in the central portion of said concave base member and at least partially protruding into the volume partially enclosed by the concave surface of said concave base member.

9. The headlamp and shield of claim 8, wherein said source of light comprises at least one lamp filament and wherein said shield is positioned so that said filament is centered relative to said second member and above the intersection of said elongated surfaces forming said second member and wherein a portion of the light from said filament impinges upon said shield and is doubly reflected from said shield, first from said second member to said base member and secondly from said base member to said concave reflector.

10. The headlamp and shield of claim 9, wherein said concave reflector comprises a heel portion and wherein light from said filament impinges upon said base member and is reflected in a dispersive pattern, a major portion of the light which is so reflected being directed away from said heel portion of said concave headlamp reflector.

11. A shield for use in a headlamp comprising a concave base member having a pair of opposed, spaced apart side walls defining an opening therebetween, a second member positioned in the central portion of said opening between said side walls to provide spaced openings on opposite sides of said second member, each of said opposed side walls comprising a planar portion positioned intermediate two curved portions, said second member being in the general shape of a V-shaped trough having two intersecting, elongated legs, each of said legs being connected to each of said planar portions, and said second member at least partially protruding into the volume partially enclosed by the concave surface of said concave base member.

12. The shield of claim 11 wherein the interior angle formed by said legs of said V-shaped second member is 126°.

13. The shield of claim 11 wherein each of the interior angles formed by said legs of said V-shaped second member and said planar portions of said side walls is 118°.

14. The shield of claim 13 wherein each of said angles is from about 90° to 135°.

* * * * *

UNITED STATES PATENT OFFICE
CERTIFICATE OF CORRECTION

Patent No. 3,749,906         Dated  July 31, 1973

Inventor(s)  William G. Thiry

It is certified that error appears in the above-identified patent and that said Letters Patent are hereby corrected as shown below:

Column 1, line 27, after "10°" insert --up--.

Column 3, line 44, change "24" to --34--.

Column 4, line 11, change "R2" to --R1--;

same line, delete "R8" and insert --R5, R7--.

Column 5, line 23, (claim 10, line 6) delete "headlamp".

Signed and sealed this 27th day of November 1973.

(SEAL)
Attest:

EDWARD M. FLETCHER, JR.
Attesting Officer

RENE D. TEGTMEYER
Acting Commissioner of Patents